US006532988B1

(12) United States Patent
Ericson

(10) Patent No.: US 6,532,988 B1
(45) Date of Patent: Mar. 18, 2003

(54) AIR ADMITTANCE VALVE FOR SANITARY WASTE PIPE SYSTEM

(76) Inventor: Kurt Sture Birger Ericson, Prins Boudewijnlaan, 48, B-2970 Schilde (BE)

(*) Notice: Subject to any disclaimer, the term of this patent is extended or adjusted under 35 U.S.C. 154(b) by 0 days.

(21) Appl. No.: 09/890,657

(22) PCT Filed: Feb. 2, 2000

(86) PCT No.: PCT/BE00/00013
§ 371 (c)(1),
(2), (4) Date: Feb. 25, 2002

(87) PCT Pub. No.: WO00/46454
PCT Pub. Date: Aug. 10, 2000

(30) Foreign Application Priority Data

Feb. 3, 1999 (EP) .............................. 99870020

(51) Int. Cl.[7] .............................. F16K 17/12
(52) U.S. Cl. .................. 137/516.11; 137/526
(58) Field of Search .................. 137/216.2, 516.11, 137/526

(56) References Cited

U.S. PATENT DOCUMENTS

| | | | |
|---|---|---|---|
| 3,923,081 A | * 12/1975 | Persson | ...... 137/526 |
| 4,436,107 A | 3/1984 | Persson | |
| 4,518,014 A | * 5/1985 | McAlpine | ...... 137/526 |
| 4,867,802 A | * 9/1989 | Earl | ...... 137/526 |
| 5,881,759 A | * 3/1999 | Andersson | ...... 137/526 |
| 5,983,929 A | * 11/1999 | Andersson | ...... 137/526 |
| 6,095,192 A | * 8/2000 | Gleasman et al. | ...... 137/625.68 |

FOREIGN PATENT DOCUMENTS

| | | |
|---|---|---|
| CH | 201565 A | 2/1939 |
| EP | 100657 | 2/1984 |
| EP | 278746 A2 | 8/1988 |
| EP | 409506 A | 1/1991 |
| FR | 1152297 A | 2/1958 |
| GB | 2112906 A | 7/1983 |

* cited by examiner

Primary Examiner—Gerald A. Michalsky
(74) Attorney, Agent, or Firm—Hovey Williams, LLP

(57) ABSTRACT

The invention relates to a valve for admitting atmospheric air into the waste pipe system in response to pressure reduction in the system for protecting the water traps in the system and to prevent atmospheric discharge of contaminated air from the waste pipe system. The valve consists of a valve body having at least two air inlet openings in communication with the atmospheric air, each of the openings alternating with a passage towards the waste pipe system, the openings and passages being equally distributed within the valve housing viewed in horizontal cross-section about the valve seat level. The valve member resting, in a normal closed position, on the valve seat separating the openings from the passages and having a substantially butterfly shaped sealing surface for a valve embodiment having two diametrically opposed openings situated perpendicular respectively to two diametrically opposed passages.

17 Claims, 4 Drawing Sheets

AIR ADMITTANCE VALVE FOR SANITARY WASTE PIPE SYSTEM

FIELD OF THE INVENTION

This invention relates to an air admittance valve to be connected to a sanitary waste pipe system in order to protect the water traps in the system and to prevent communication between waste pipes or sewers systems with surrounding atmosphere, said valve opens automatically to admit outside atmospheric air into the pipe system upon presence of a pressure drop within said pipe system.

A building drainage and vent system involves, in normal operating conditions, the establishment of an induced air flow within the vertical stacks of the system due to the unsteady water downfall generated by any appliance discharge. In order to protect the habitable space against contaminated odours, each appliance is normally protected by a water trap seal. Variation due to water downfall within the drainage system, generates occasional variations in air pressure that are often capable of disturbing these water trap seals either by siphonage due to a sudden under-pressure in the system or as a result of back pressures following air path closures by water surcharge.

DESCRIPTION OF THE PRIOR ART

Specially designed air admittance valves have been introduced to avoid said inconveniences and also offers the possibility of avoiding the necessity to vent the waste pipe system outside the roof of the building as said valves only open in response to sub-atmospheric pressure conditions in the waste pipe system.

Preferably, said valves are designed to assure a maximum possible air inlet flow from the air inlet of the valve to the waste pipe system while passing through the temporary opened valve membrane.

The U.S. Pat. No. 4,232,706, in the name of the applicant, discloses an automatic valve device in which a vertical tube, constituting the body of the valve, comprises at its upper end a constriction in the form of a Venturi which co-operates with a cover so as to form a peripheral air inlet provided with an annular valve member situated at the exterior of the constriction and which can be tilted when a negative pressure occurs in the pipes while permitting the fresh air to penetrate into the vertical waste water pipe and which, when the pressure is equilibrated or when there is overpressure, occupies a closed position in which the escape of contaminated air is prevented.

Said valve comprises an annular peripheral opening which distributes the air inlet, in case of lifting of the annular valve member, towards the vertical tube in connection with the waste pipe. Although this device gives generally very good results with an increased air inlet capacity due to the venturi shaped tube, it may happen, in particular circumstances that some turbulence may occur between the annular air inlet opening and the passage to the waste pipe. Said turbulence may occur when all of the air flow coming from the outer diameter of the annular valve member, in lifted position, is forced to be concentrated into a central tube portion of the pipe system having a smaller diameter and generally a smaller section than the overall annular valve section and will reduce, in some extend, the air inlet capacity.

In valves of this kind, the circular or annular valve member is generally resting on two concentric valve seats having each a circular sealing surface. In case of deformation or distortion of the valve member, problems could occur with the necessary airtight closure of said valve member with at least one of the two sealing surfaces.

An other kind of air admittance valve is disclosed in the parent document CH 201 565. This valve contains two diametrically opposed air inlet openings alternating with two diametrically opposed peripheral grooves connecting the upper surface of a circular disc shaped valve member with the waste pipe system. The air flow distribution in said valve is very limited, especially through the two narrow grooves, so that this kind of valve only can be used for one single sanitary appliance.

Patent document EP 0 409 506 discloses a valve device in which an annular peripheral air inlet is in communication with the lower face of an disc shaped valve member through one single radial passage. This passage disturbs the air flow towards the waste pipe system upon opening of the valve member. Obviously, the bad distribution of the air flow passages will create important turbulence in the air inlet and have a negative effect on the air inlet capacity of the valve.

SUMMARY OF THE INVENTION

A first object of the invention is to provide an automatic air admittance valve avoiding as much as possible the air turbulence within the valve by providing a optimum distribution in the vicinity of the valve function elements between the air inlet openings and the passages towards the waste pipe.

A second object of the invention is to provide a well balanced valve member shape and corresponding valve seat opening, allowing an optimum air distribution within the valve and providing a maximum lifting power to the valve member, the valve seat having only one sealing surface reducing the possible leakage problems of the valve member in closed position.

A third object of the invention is to provide the interior surface of the valve body with a plurality of means to improve the evacuation and collection of condensed water and to divert it into the waste pipe.

A fourth object of the invention is to incorporate grid netting immediately in the moulding of the valve housing, both in the air inlet openings and in the passages to the waste pipe, some of the grid elements being provided with enlarged portions in order to support the valve member in case of overpressure or fire in the waste pipe system.

A fifth object of the invention is to provide an air admittance valve for sanitary waste pipe systems which is easy to manufacture comprising only three components, each of them being directly obtain ed by a moulding process.

The above objects are achieved in accordance with the to principles of the present invention which are described more particularly in the annexed set of claims.

Numerous characteristics, advantages and features of the invention will appear from the following description of embodiments of the valve according to the invention and in which reference is made to drawings in which:

DESCRIPTION OF THE PREFERRED EMBODIMENTS

Figure 1:
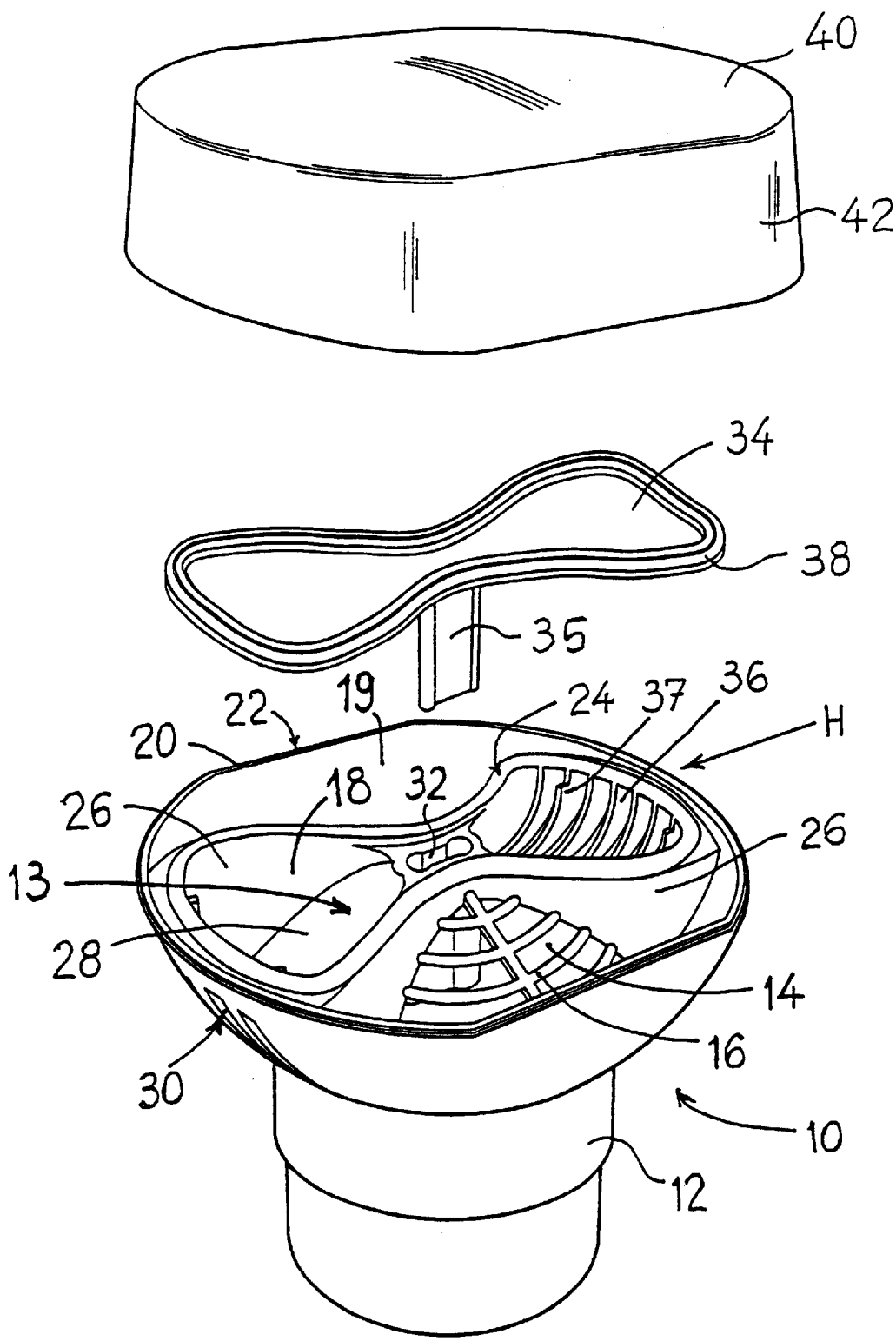
FIG. 1: is an exploded view of a valve according to the invention, showing the three main components.

As shown in FIG. 1, the air admittance valve, according to the present invention, comprises a valve body 10 having a lower part comprising a vertical tubular member 12 adapted to be connected to a sanitary waste pipe (not shown) being part of a sanitary waste water pipe system.

Figure 2:
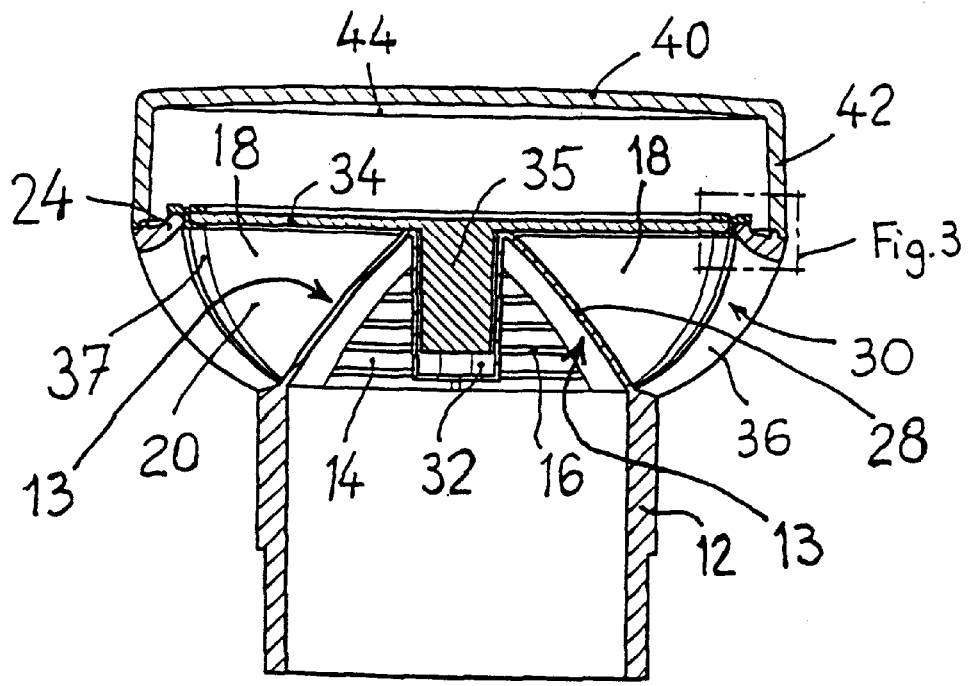
FIG. 2 is a sectional view of an assembled valve, similar to FIG. 1.

According to the invention, the upper end of the tubular member 12 has a conical shaped restriction 13 which is closed at its extremity (see also FIG. 2). The conical upper portion 13 of the tubular member 12 is provided with two diametrically opposed passages 14 each of which has a moulded-in grid 16 to prevent strange objects, such as animals or insects, to enter the waste pipe system.

The conical upper portion 13 of the tubular member 12 is surrounded by an oblong bowl-shaped housing 20, extending upwards from the tubular member 12 and having, an upper edge 22 which is situated about an horizontal plane H crossing the upper extremity of the conical portion 13 of the tubular member 12.

The space between the bowl-shaped housing 20 and the conical portion 13 of the tubular member 12 is subdivided by a partition 26 into mutually opposed orthogonally arranged pairs of first and second chambers.

The first pair of chambers are delimited by the partition 26 and closed sections 28 of the conical portion 13 and are in communication with the surrounding atmosphere via openings 30 in the bowl-shaped housing 20.

The second pair of chambers are delimited by the partition 26 and the bowl-shaped housing 20 and are in communication with the lower tubular member 12 via the passages 14 in the conical portion 13 of the tubular member 12.

The upper edge of the partition 26 is located about the horizontal plane H and is configured so as to form a valve seat 24.

A valve member 34 is carried on the upper edge of the partition 26 and is normally seated on the valve seat 24 to isolate the first pair of chambers 18 from the second pair of chambers 19 when the internal pressure in the waste pipe system is at least equal to the atmospheric pressure.

The valve member 34 is lifted or elevated above the valve seat 24 in response to a lowering of the internal pressure below the atmospheric pressure to hereby place the first pair of chambers 18 in communication with the second pair of chambers 19, thus admitting atmospheric air into the waste pipe system connected to the lower tubular member 12.

The valve member 34 and the corresponding valve seat 24 have preferably a butterfly shaped form which is positioned in a longitudinal direction inside the oblong bowl-shaped housing 20.

The openings 30 in the bowl-shaped housing are also provided with a grid 36 to avoid interference between the valve member 34 with any foreign object.

According to the embodiment shown in FIGS. 1 to 6, the closed extremity of the conical portion of the tubular member 12, is provided with a closed cavity 32 extending downwards and being arranged as a fixed female guiding mean for the valve member 34 which is, for that purpose provided with a projection 35 (movable male guiding mean) having similar dimensions as the cavity 32.

The valve member 34 has a particular shape so as to match with the butterfly shaped valve seat 24 and is realised out of two different materials the main part 34 in hard plastic material and the peripheral border part 38 in soft plastic material.

These two parts being heat fused together preferably in a way as explained in European Patent EP 0 701 504 in the name of the applicant.

Figure 3:
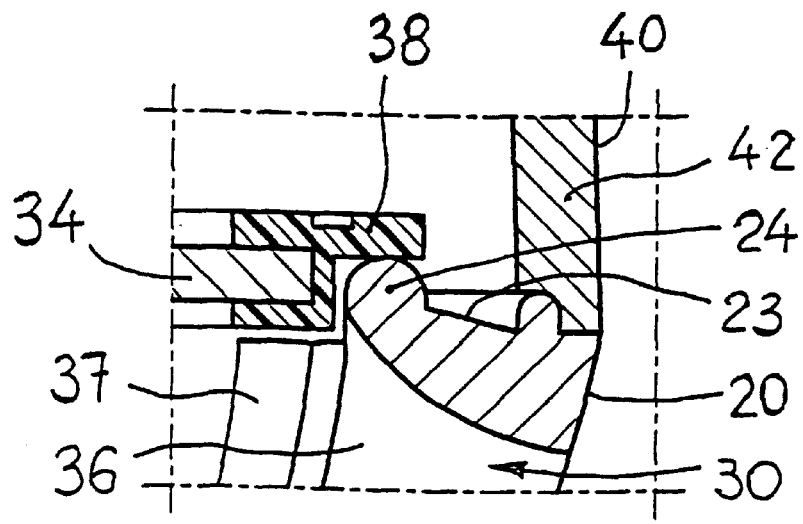
FIG. 3: is an enlarged view of a detail in FIG. 2, in which is shown the valve function elements, including the valve member resting on the valve seat.

Only the soft and flexible peripheral border 38 of the valve member 34 is in contact with the valve seat 24 so as to obtain a tightly closed condition when the valve member 34 is in normal closed position (see also FIG. 3).

Means are also provided to prevent stagnation of condensed water within the valve housing.

Figure 4:
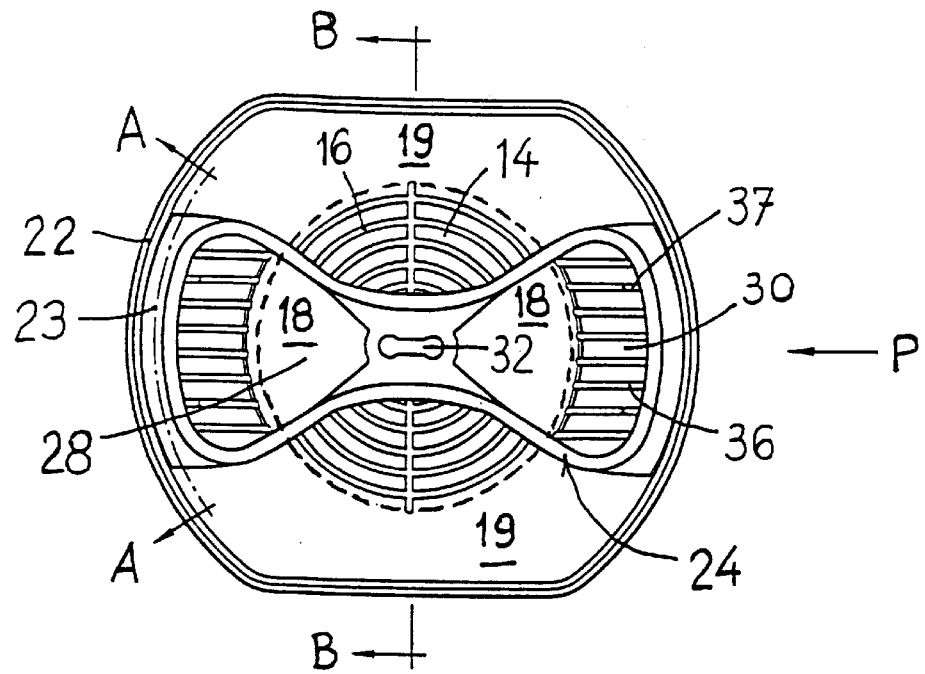
FIG. 4: is a top view of the lower part of the valve body showing respectively two air inlet openings and two passages towards the waste pipe.
Figure 5:
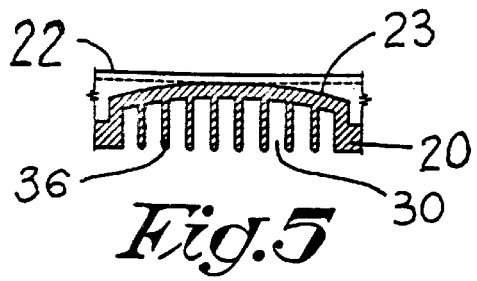
FIG. 5: is a detailed sectional view along the line A—A in FIG. 4.
Figure 6:
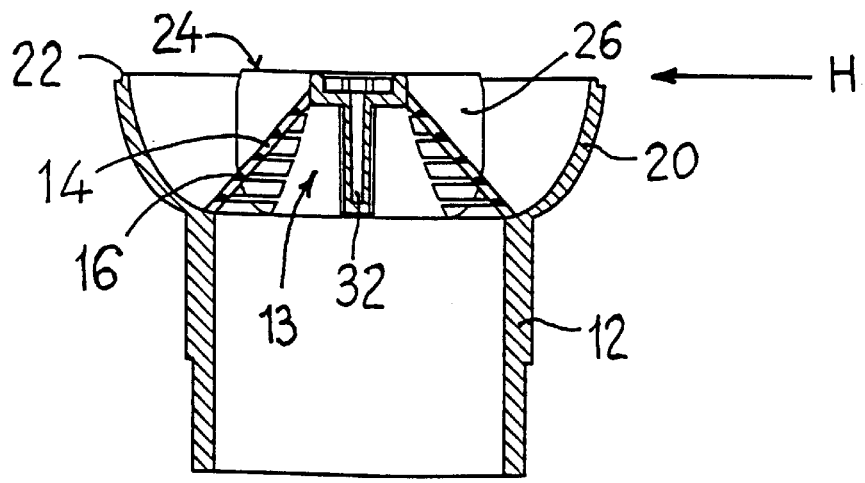
FIG. 6: is cross sectional view of the lower part of the valve body along the line B—B in figure.
Figure 7:
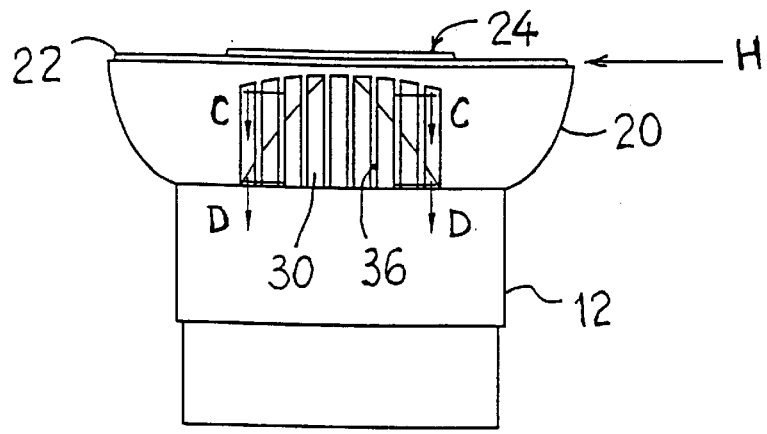
FIG. 7: is a lateral view of the lower part of the valve body seen from arrow P in figure.

As shown in FIGS. 3 and 4, the area between the upper edge 22 of the bowl-shaped housing 20 and the valve seat 24 is provided with a gutter 23, the bottom of which is rounded so as to facilitate the evacuation of falling drops of condensed water towards the tubular member 12 connected to the waste pipe system.

Figure 8:
FIGS. 8 and 9: are partial sectional views along respectively the lines C—C and D—D in FIG. 7.
Figure 9:

In order to improve the air inlet flow, the grid 36 of the openings 30 are made of elements having an aerodynamic or droplet-like cross section, as can be seen in FIGS. 8 and 9 of the drawings.

Preferably, at least two of said grid elements 37 are provided with an enlarged flattened upper region so as to support the valve member 34 in case heavy overpressure occurs in the waste pipe system. Also in case of fire in the waste pipe system, the fire resistant main part of the valve member 34 can be supported by the grid elements 37. Indeed, due to the soft and flexible outer edge 38, the valve member 34 could be drawn downwards and could be stuck beneath the level of the valve seat 24 in case of heavy overpressure or fire in the waste pipe system.

Of course, it is also be possible to provide the elements of the grid 16 of the passages 14 with a aerodynamic drop-like shaped cross section.

Finally, the valve body 10 is closed with an upper lid 40, closing the upper edge 22 of the bowl-shaped housing 20 in a complete air-tight manner.

The side walls 42 of the upper lid 40 are slightly conical with the same purpose to facilitate the evacuation of condensed water. For the same reason, the upper wall of the lid 40 is slightly rounded and the inner surface of said wall are provided with radially arranged ribs 44 to evacuate the condensation of water towards the periphery.

In case the pressure in the waste pipe drops below the atmospheric pressure, the valve member 34, which lower surface is in communication with the atmospheric air pressure and which upper surface is in communication with the waste pipe pressure, will promptly be tilted upwards, allowing the atmospheric air to enter through the openings 30 and the vertical gap, created between the valve seat 24 and the peripheral border 38 of the valve member 34, towards the passages 14 of the tubular member 12 and into the waste pipe system.

The valve according to the invention and in particular the special butterfly shaped surface of the valve function elements, i.e. the valve member 34 and valve seat 24, provide a maximum lifting power of the valve member on the one hand and a well balanced distribution of the air flow passage within the valve body on the other hand.

In order to obtain said well balanced distribution of the air flow, it is important that the total surface of the air flow passage area through the open valve function elements 24, 34 is substantially equal to the total surface of the air inlet openings 30.

For an optimum valve capacity it is also important that the total surface of the air flow passage through the open valve function elements 24, 34 is substantially equal to the total surface of the passages 14 from the valve function elements towards the waste pipe system as well as to the inner surface of the tubular member 12.

To improve the function of the valve and in particular the lifting power of the valve member 34 from its seat 24, it is also important that the ratio between the total surface inside the periphery of the valve seat 24 and the total surface left between the seat 24 and the inner side of the bowl-shaped housing 20 (representing the possible depression zone) is preferably less than 1.

In case more than two openings are to be provided, alternating with more than two passages, the shape of the valve seat and corresponding valve member will have to be adapted. Instead of a butterfly shaped valve member one could obtain a triangular or shamrock shaped valve member.

Figure 10:
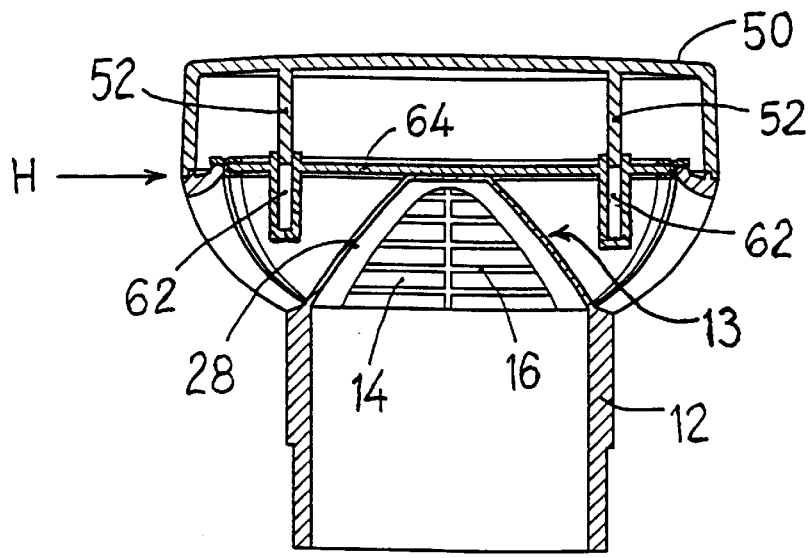
FIG. 10: is a sectional view in accordance with FIG. 2, but showing another embodiment of an assembled valve according to the invention.

Another embodiment of the invention, representing another possible guiding arrangement of the valve member, is shown on FIG. 10.

According to said embodiment the inner surface of upper lid 50 is provided with at least two projections 52 (fixed male guiding means) extending downwards until about the horizontal level H, and engaging corresponding cavities 62 (movable female guiding means) are provided on the main part of the valve member 64.

Upon occasional lifting of the valve member 64, said valve will be guided with its cavities 62 by means of the projections 52 fixed onto the upper lid 50. In this case the air inlet flow will even be increased because the guiding, cavities 62 will retract themselves partly away from the air inlet flow during the lifting of the valve member 64.

In order to improve the guiding characteristics, the projections 52 could also be made out of metal.

According to this invention, the guiding of the valve member during the lifting up and lowering sequence, can be obtained either by means of a fixed female guide 32 and a male guide 35, which is part of the valve member, or by means of fixed male guides 52 and movable female guide 62 incorporated in the valve member.

Tests have shown that the capacity of the valve according to the present invention has significantly improved with respect to the existing air admittance valves.

The purpose of the embodiments described herewith is only to illustrate the invention while still other variations are possible without falling out of the scope of the invention as expressed in the following claims.

LEGEND OF THE REFERENCE NUMERALS

10: lower part of the valve housing
12: tubular member
13: upper conical portion of 12
14: passages towards the upper part of the valve
16: passage grid
18: first pair of chambers
19: second pair of chambers
20: oblong bowl-shaped housing
22: upper edge of the housing 20
24: valve seat
23: gutter
26: partition
28: closed sections of the conical portion 13
30: air inlet openings
32: cavity
34: valve member
35: projection (male guide)
36: air-inlet opening grid
37: supporting grid element
38: peripheral border of 34
40: upper lid
42: side wall
44: ribs
50: upper lid
52: guiding projections
62: cavities (female guide)
64: valve member

What is claimed is:

1. Air admittance valve adapted for connection to a sanitary waste pipe system having a waste pipe and water traps, the air admittance valve providing for admitting atmospheric air into the waste pipe towards valve function elements of the valve in response to a pressure reduction in the system in order to protect the water traps in the system and to prevent discharge of contaminated air from the system to the atmosphere, the valve comprising a valve body including valve function elements and having:

a vertical tubular member adapted to be connected to the waste pipe, the tubular member having an inner space and including an upper section which tapers inwardly and upwardly so that the cross section diminishes at an upper end of the upper section to present an upper conical portion;

at least two passages provided in the upper conical portion which communicate air from the inner space of the tubular member towards the valve function elements;

a cover member overlying said upper section and having a top wall spaced above the upper end of the tubular member;

the valve function elements including a valve member situated between the upper end of the tubular member and the top wall of the cover member, said valve member resting on a valve seat having a sealing surface situated at a level in an horizontal plane passing near the upper end of the tubular member and being freely movable upwards from the valve seat, said valve member having an upper surface and a lower surface; and at least two atmospheric air inlet openings being in communication with the lower surface of the valve member, while the upper surface of the valve member being in communication with the waste pipe system through the at least one passage so as to close said valve member when the pressure in the waste pipe equals or exceeds atmospheric pressure and to open said valve member in order to create an atmospheric air flow passage into the waste pipe when the pressure in the waste pipe is less than the atmospheric pressure, wherein the valve body further comprises an oblong bowl-shaped housing and a partition subdividing the interior of the bowl-shaped housing into mutually opposed orthogonally arranged pairs of first and second chambers, the first pair of chambers being in communication with the surrounding atmosphere via said openings which are provided in the housing and said second pair of chambers being in communication with the lower tubular member and the waste pipe system via the passages in the upper conical portion of the tubular member.

2. Air admittance valve according to claim 1, wherein the first pair of chambers and the second pair of chambers are equally spaced in a horizontal cross section so as to obtain a well balanced air flow within the valve body.

3. Air admittance valve according to claim 1, wherein the air inlet openings are arranged in the bowl-shaped housing located outside the conical portion of the tubular member, the housing having an upper edge situated about the valve seat level.

4. Air admittance valve according to claim 1, wherein the valve function elements comprising the valve seat and the corresponding valve member have a substantially butterfly shaped sealing surface which is positioned in a longitudinal direction with respect to the oblong valve body.

5. Air admittance valve according to claim 4, wherein the ratio between the total surface within the substantially butterfly shaped valve seat sealing surface and the total surface left between the seat and the inner side of the bowl-shaped housing, representing the possible depression zone, is less than 1 so as to create a maximum lifting power of the valve member from the valve seat.

6. Air admittance valve according to claim 1, wherein the total surface of the air flow passage through the open valve function elements is substantially equal to the total surface of the air inlet openings and substantially equal to the total surface of the passages from the valve function elements towards the waste pipe system.

7. Air admittance valve according to claim 1, wherein the total surface of the air flow passage through the open valve function elements is substantially equal to the inner surface of the tubular member.

8. Air admittance valve according to claim 1, wherein the housing of the valve body is provided with partitions subdividing the interior of the housing so as to obtain a substantially equally spaced and balanced air flow distribution within the body between the atmospheric air inlet opening and the passage towards the waste pipe system when the valve member is in an open position.

9. Air admittance valve according to claim 1, wherein the upper conical shaped portion of the tubular member has an extremity which is closed and is provided with at least two peripheral passages leaving between them closed sections.

10. Air admittance valve according to claim 1, wherein the housing has an outer wall and wherein the valve seat comprises one continuous sealing surface which extends downwards with a partition delimiting the space inside the outer wall between respectively the passages and the closed sections of the conical portion of the tubular member.

11. Air admittance valve according to claim 1, wherein the valve member is provided with a male guiding means co-operating with a fixed female guiding means provided in the body.

12. Air admittance valve according to claim 1, wherein the valve member is provided with female guiding means co-operating with fixed male guiding means provided on the cover member of the valve body.

13. Air admittance valve according to claim 1, wherein the valve body has an inner surface which is provided with a gutter, conical side walls and radially arranged ribs for improving the evacuation of condensed water.

14. Air admittance valve according to claim 1, wherein the valve member is made out of at least two different materials, a main part of the valve member being made out of hard, fire resistant material and a peripheral border part of the valve member being made out of a relatively softer, flexible material relative to material of the main part.

15. Air admittance valve according to claim 1, wherein the openings and the passages are respectively provided with grids.

16. Air admittance valve according to claim 15, wherein the grids are made with elements having an aerodynamic, substantially droplet-shaped cross section.

17. Air admittance valve according to claim 15, wherein the grid comprises a plurality of grid elements, at least two of said grid elements being provided with an enlarged, flattened upper region capable of supporting the valve member in the event of overpressure or fire in the waste pipe system.

* * * * *